July 11, 1972 I. T. KROHN ET AL 3,676,116

IMAGE REVERSAL IN MANIFOLD IMAGING USING AN ELECTRICALLY CONDUCTIVE RECEIVER SHEET

Filed Dec. 18, 1970

INVENTORS
GEDEMINAS J. REINIS
GEOFFREY A. PAGE
IVAR T. KROHN

BY Raymond C. Loyer

ATTORNEY 3,676,116
Patented July 11, 1972

3,676,116

IMAGE REVERSAL IN MANIFOLD IMAGING USING AN ELECTRICALLY CONDUCTIVE RECEIVER SHEET

Ivar T. Krohn, Geoffrey A. Page, and Gedeminas J. Reinis, Rochester, N.Y., assignors to Xerox Corporation, Stamford, Conn.

Continuation-in-part of abandoned application Ser. No. 812,734, Apr. 2, 1969, and application Ser. No. 81,357, Oct. 16, 1970. This application Dec. 18, 1970, Ser. No. 99,721
Int. Cl. G03g 13/22
U.S. Cl. 96—1.3 23 Claims

ABSTRACT OF THE DISCLOSURE

An imaging process wherein a cohesively weak electrically photosensitive imaging layer sandwiched between a donor sheet and an electrically conductive receiver sheet is subjected to an electric potential and imagewise electromagnetic radiation to which the layer is sensitive such that upon sandwich separation under an electric field the imaging layer fractures in imagewise configuration providing a positive image on one of the sheets and a negative image on another sheet. Prior to sandwich separation, the electric potential is modified causing a reversal of image sense on each of the sheets.

BACKGROUND OF THE INVENTION

The present invention relates to manifold layer transfer imaging and more specifically to a process which provides improved images. This application is a continuation-in-part of our copending applications Ser. No. 812,734, filed Apr. 2, 1969, now abandoned and Ser. No. 81,357, filed Oct. 16, 1970.

Although color imaging techniques based on the transfer of an imaging layer have been known in the past, these techniques have always been difficult to operate because they depend on photochemical reactions and generally involve the use of distinct layer materials for the two functions of imagewise transfer and image coloration. A typical example of the complex structures and sensitive materials employed in prior art techniques is described in U.S. Pat. 3,091,529 to Buskes. A more comprehensive discussion of prior art imaging techniques based on layer transfer may be found in copending application Ser. No. 452,641, filed May 3, 1965 in the U.S. Patent Office, now abandoned.

Copending application Ser. No. 452,641, filed May 3, 1965, now abandoned, describes an imaging system utilizing a manifold sandwich comprising a photosensitive material between a pair of sheets. In this imaging system, an imaging layer is prepared by coating a layer of cohesively weak electrically photosensitive imaging material onto a substrate. In one form the imaging layer comprises a photosensitive material such as metal-free phthalocyanine dispersed in a cohesively weak insulating binder. This coated substrate is called the donor. When needed, in preparation for the imaging operation, the imaging layer is activated as by contacting it with a swelling agent, solvent or partial solvent for the material or by heating. This step may be eliminated, of course, if the layer retains sufficient residual solvent after having been coated on the substrate from a solution or paste or if sufficiently cohesively weak to fracture in response to the application of electromagnetic radiation and electrical field. After activation a receiving sheet is laid over the surface of the imaging layer. An electrical field is then applied across the imaging layer while it is exposed to a pattern of light and shadow representative of the image to be reproduced. Upon separation of the donor substrate or sheet and receiving sheet, the imaging layer fractures along the lines defined by the pattern of light and shadow to which the imaging layer has been exposed. Part of the imaging layer is transferred to one of the sheets while the remainder is retained on the other sheet so that a positive image, that is, a duplicate of the original is produced on one sheet while a negative image is produced on the other. Copending application Ser. No. 609,058, filed Jan. 13, 1967, now abandoned, described a manifold imaging process wherein after the imaging step the electric field across the imaging layer is modified by reducing, grounding or reversing the field. By such means the image sense normally obtained in the manifold imaging process is reversed. That is, the positive and negative image sense obtained is reversed when the electric field employed during the imaging step is modified subsequent to the imaging step but prior to sandwich separating.

Although usable images are obtained by means of the manifold imaging process wherein by field modification the image sense on the donor and receiver sheets is reversed, a great improvement in image quality has been discovered when the receiver employed in the manifold sandwich is electrically conductive.

SUMMARY OF THE INVENTION

It is, therefore, an object of this invention to provide an imaging process which overcomes the above noted disadvantages.

Another object of this invention is to provide a layer transfer imaging process wherein the electrical field across the imaging layer is reversed.

Another object of this invention is to provide a process for layer transfer for imaging which provides images of improved quality.

There has now been discovered a manifold imaging process which provides images of significantly improved quality wherein the electrical potential across the imaging layer is modified after image exposure. Such improved images are obtained by employing in the manifold sandwich a receiver which is electrically conductive. As employed in the specification and the claims, the term "electrically conductive" is intended to mean materials which have an electrical resistance of less than $1\times10^{15}$ ohms cm.

Previously, only electrically insulating donors and receivers were employed in the manifold process wherein the electrical potential was modified after imaging. In the process of this invention, although conductive materials may be employed, the donor substrate or sheet may comprise any insulating material such as polyethylene, polypropylene, polyethylene terephthalate, cellulose acetate, paper, plastic coated paper, such as polyethylene coated paper and mixtures thereof. For use as a donor substrate, Mylar, a polyester formed by the condensation reaction between ethylene glycol and terephthalic acid, available from E. I. du Pont de Nemours Inc. is preferred because of its physical strength and because it has good insulating properties.

The receiver sheet in the manifold process of this invention comprises any suitable electrically conductive materials. Typical electrically conductive materials are conductive metals such as: aluminum, tin, iron, steel, brass, copper; conductively coated glass such as tin or indium oxide coated glass, aluminum coated glass, conductive coatings on plastic substrates are preferred because of their flexibility. Aluminized Mylar or aluminized styrene are particularly preferred because of their flexibility and availability. In addition, paper rendered conductive by the inclusion of a suitable chemical therein or through conditioning in a humid atmosphere to insure the presence therein of sufficient water content to render the material conductive can also be employed.

The electrical field can be provided by means known to the art for subjecting an area to an electrical field. The electrodes employed may comprise any suitable conductive material and may be flexible or rigid. Typical conductive materials include metals such as aluminum, brass, steel, copper, nickel, zinc, etc., metallic coatings on plastic substrates, rubber rendered conductive by the inclusion of a suitable material therein or paper rendered conductive by the inclusion of a suitable material therein or through conditioning in a humid atmosphere to insure the presence therein of sufficient water content to render the material conductive. In instances wherein the donor and receiver sheets are capable of retaining a static charge for at least a limited period of time, a preformed manifold sandwich can be passed between and in contact with at least two pairs of electrodes which transmit static charges sufficient to provide an electric potential across the sandwich during subsequent image exposure and sandwich separation steps in the process of this invention. Such electrodes are, for example, conductive rollers or corona discharge devices as described in U.S. Pat. No. 2,588,699 to Carlson and U.S. Pat. No. 2,777,957 to Walkup. Other means of transmitting a static charge will occur to those skilled in the art. In the process of this invention wherein the imaging layer is exposed to activating electromagnetic radiation while positioned between electrodes, one of the electrodes must be at least partially transparent. The transparent conductive electrode may be made of any suitable conductive transparent material and may be flexible or rigid. Typical conductive transparent materials include cellophane, conductively coated glass, such as tin or indium oxide coated glass, aluminum coated glass or similar coatings on plastic substrates. NESA, a tin oxide coated glass available from Pittsburgh Plate Glass Co., is preferred because it is a good conductor, highly transparent and is readily available. In the process of this invention wherein the donor and/or receiver is composed of conductive materials, each may also be used as the electrode by which the imaging layer is subjected to an electric field. That is either one or both of the donor sheet and receiver sheet may serve a dual function in the process of this invention.

The strength of the electrical potential applied across the manifold sandwich depends on the structure of the manifold set and the materials used. The potential strength required may, however, be easily determined. If too large a potential is applied, electrical breakdown of the manifold sandwich will occur allowing arcing between the electrodes. If too little potential is applied, the imaging layer will not fracture in imagewise configuration. The preferred potentials across the manifold sandwich are, however, in the range of from about 2,000 volts per mil to about 7,000 volts per mil. Since relatively high potentials are utilized, it is desirable to insert a resistor in the circuit to limit the flow of current. Resistors on the order of from about 1 megohm to about 20,000 megohms are conventionally used.

A visible light source, an ultraviolet light source or any other suitable source of actinic electromagnetic radiation may be used to expose the imaging layer of this invention. The electrically photosensitive material is chosen so as to be responsive to the wavelength of the electromagnetic radiation used. It is to be noted that different electrically photosensitive materials have different spectral responses and that the spectral response of many electrically photosensitive materials may be modified by dye sensitization so as to either increase or narrow the spectral response of the material to a peak or to broaden it to make it more panchromatic in its response.

It has been found that by reversing the field across the imaging layer the images obtained on the receiver sheet and donor sheet are reversed. It is, thus, possible to provide a high quality positive image on opaque receiver materials.

The imaging layer may be exposed either through the donor sheet or the receiver sheet. Since exposure through the donor substrate allows the use of opaque receiver sheets, it is preferred to expose through the donor sheet. The light image may be formed by projecting light through a transparency or by projecting light information from an opaque subject.

It has also been found that certain imaging layers respond to reverse biasing without exposure to activating electromagnetic radiation. That is, initially the imaging layer adheres more strongly to the donor sheet than to the receiving sheet; however, by charging the set by applying a field across the set and then reversing the field across the set certain imaging layers are found to adhere more strongly to the receiver sheet than to the donor sheet. It is, therefore, possible to provide a system wherein the manifold set is given a uniform charge and then placed in an imagewise field of opposite polarity. Upon separation of the donor and receiver sheets, the imaging layer fractures in imagewise configuration providing a positive image on one of the sheets and a negative image on the other. For these imaging layers then it is not necessary to provide photosensitive pigments dispersed in a binder, instead, pigments not considered photosensitive may be incorporated in the imaging layer. Typical of these pigments are carbon black, iron oxides, lead chromate in paste form designated "alkyl" paste, titanium dioxide, lead chromate and the various pigments used in printing inks and mixtures thereof.

In addition, it has been found that certain exposed imaging layers will reverse images when grounded before separation and in some cases imaging layers respond to a reduction in potential of the same polarity. That is, if the potential across the manifold set is reduced subsequent to imaging, those areas of the imaging layer which normally adhere to the receiver and donor sheets adhere instead to the donor and receiver sheets respectively.

The extent to which the potential must be reduced to achieve effective field reversal across the imaging layer varies greatly and is dependent upon the original potential across the manifold set ($V_o$), the original potential across the imaging layer ($V_L$), the dielectric constant of the receiver sheet ($K_R$), that of the donor sheet ($K_D$), that of the imaging layer ($K_L$), and the thickness of the donor sheet ($d_D$), the receiver sheet ($d_R$), and the imaging layer ($d_L$). The maximum reduced potential ($V_R$) can be calculated for any particular manifold set by the formula:

$$V_R = V_o - V_L\left[1 + \frac{K_L}{d_L}\left(\frac{d_D}{K_D} + \frac{d_R}{K_R}\right)\right]$$

In most cases a reduction of the potential to a value below ½ to ⅓ of the original potential is sufficient to achieve image reversal.

In general, therefore, the steps of this invention are to form a manifold sandwich, establish an electric field across the imaging layer, expose the imaging layer to imagewise electromagnetic radiation, modify the electric field across the imaging layer and separating the receiver and donor sheets. By "modifying" then is meant that the electric field across the imaging layer is reversed by means of either reducing, including grounding, or reversing the potential across the set or sandwich.

The imaging layer contains any suitable electrically photosensitive material. Typical organic materials include quinacridones such as: 2,9-dimethyl quinacridone, 4,11-dimethyl quinacridone, 2,10-dichloro-6,13-dihydro-quinacridone, 2,9-dimethoxy-6,13-dihydro-quinacridone, 2,4,9,11-tetrachloro-quinacridone, and solid solutions of quinacridones and other compositions as described in U.S. Pat. 3,160,510; carboxamides, carboxanilides, triazines, anthraquinones, azo compounds, salts and lakes of compounds, dioxazines, lakes of fluorescein dyes; bisazo compositions, pyrenes, phthalocyanines such as: beta-form metal-free phthalocyanine, copper phthalocyanine, tetrachloro phthalocyanine, the "X"-form of metal-free phthalocyanine, as described in U.S. Pat. 3,357,989; metal salts and lakes of azo dyes and mixtures thereof. Typical examples of the above named photosensitive materials are described in copending application Ser. No. 708,380 filed Feb. 26, 1968 which application is incorporated herein by reference.

Typical inorganic compositions include cadmium sulfide, cadmium sulfosenenide, zinc oxide, zinc sulfide, sulphur selenide, mercuric sulfide, lead oxide, lead sulfide, cadmium selenide, titanium dioxide, indium trioxide and the like.

In addition to the aforementioned organic materials, other organic materials which may be employed in the imaging layer include polyvinyl carbazole; 2,4-bis (4,4'-diethyl-amino-phenyl)-1,3,4-oxidiazole; N-isopropyl carbazole and the like. Other electrically photosensitive materials useful in the process of this invention are listed in copending application Ser. No. 708,380, filed Feb. 26, 1968 which is incorporated herein by reference.

It is also to be understood that the electrically photosensitive particles themselves may consist of any suitable one or more of the aforementioned electrically photosensitive materials, either organic or inorganic, dispersed in, in solid solution in, or copolymerized with any suitable insulating resin whether or not the resin itself is photosensitive. This particular type of particle may be particularly desirable to facilitate dispersion of the particle, to prevent undesirable reactions between the binder and the photosensitive material or between the photosensitive and the activator and for similar purposes. Typical resins of this type include polyethylene, polypropylene, polyamides, polymethacrylates, polyacrylates, polyvinyl chlorides, polyvinyl acetates, polystyrene, polysiloxanes, chlorinated rubbers, polyacrylonitrile, epoxies, phenolics, hydrocarbon resins and other natural resins such as resin derivatives as well as mixtures and copolymers thereof.

The X-form phthalocyanine is preferred because of its excellent photosensitivity although any suitable phthalocyanine may be used to prepare the imaging layer of this invention. The phthalocyanine used may be in any suitable crystal form. It may be substituted or unsubstituted both in the ring and straight chain portions. Reference is made to a book entitled "Phthalocyanine Compounds" by F. H. Moser and A. L. Thomas, published by the Reinhold Publishing Company, 1963 edition, for a detailed description of phthalocyanines and their synthesis. Any suitable phthalocyanine may be used in the present invention. Phthalocyanines encompassed within this invention are described in the above incorporated copending application Ser. No. 708,380.

The basic physical property desired in the imaging layer is that it be frangible as prepared or after having been suitably activated. That is, the layer must be sufficiently weak structurally so that the application of electrical field combined with the action of actinic radiation on the electrically photosensitive materials will fracture the imaging layer. Further, the layer must respond to the application of field the strength of which is below that field strength which will cause electrical breakdown or arcing across the imaging layer. Another term for "cohesively weak," therefore, would be "field fracturable."

The imaging layer serves as the photoresponsive element of the system as well as the colorant for the final image produced. Preferably, the imaging layer is selected so as to have a high level of response while at the same time being intensely colored so that a high contrast image can be formed by the high gamma system of this invention. The imaging layer may be homogeneous comprising, for example, a solid solution of two or more pigments while one or more pigments being electrically photosensitive and at least one pigment being electrically photoinsensitive. The imaging layer may also be heterogeneous comprising, for example, pigment particles dispersed in a binder.

One technique for achieving low cohesive strength in the imaging layer is to employ relatively weak, low molecular weight materials therein. Thus, for example, in a single component homogeneous imaging layer, a monomeric compound or a low molecular weight polymer complexed with a Lewis acid to impart a high level of photoresponse to the layer may be employed. Similarly, when a homogeneous layer utilizing two or more components in solid solution is selected to make up the imaging layer, either one or both of the components of the solid solution may be a low molecular weight material so that the layer has the desired low level of cohesive strength. This approach may also be taken in connection with the heterogeneous imaging layer. Although the binder material in the heterogeneous system may in itself be photosensitive it does not necessarily have this property. Materials may be selected for use as this binder material solely on the basis of physical properties without regard to their photosensitivity. This is also true of the two component homogeneous system where photoinsensitive materials with the desired physical properties can be used. Any other technique for achieving low cohesive strength in the imaging layer may also be employed. For example, suitable blends of incompatible materials such as a blend of a polysiloxane resin with a polyacrylic ester resin may be used as the binder layer in a heterogeneous system or in conjunction with a "homogeneous" system in which the photoresponsive material may be either one of the incompatible components (complexed with a Lewis acid) or a separate and additional component of the layer. The thickness of the imaging layer whether homogeneous or heterogeneous ranges from about 0.2 micron to about 10 microns generally about 0.5 micron to about 5 microns and preferably about 2 microns.

The ratio of photosensitive pigment to binder by volume in the heterogeneous system may range from about 10 to 1 to about 1 to 10 respectively, but it has generally been found that properties in the range of from about 1 to 4 to 2 to 1 respectively produce the best results and, accordingly, this constitutes a preferred range.

The binder material in the heterogeneous imaging layer or the material used in conjunction with the pigment materials in the homogeneous layer, where applicable, may comprise any suitable cohesively weak insulating material or materials which can be rendered cohesively weak. Typical materials include: microcrystalline waxes such as: Sunoco 1290, Sunoco 5825, Sunoco 985, all available from Sun Oil Co.; Paraflint RG, available from the Moore and Munger Company; paraffin waxes such as: Sunoco 5512, Sunoco 3425, available from Sun Oil Co.; Sohio Parawax available from Standard Oil of Ohio; waxes made from hydrogenated oils such as: Capitol City 1380 wax, available from Capitol City Products, Co. Columbus, Ohio; Caster Wax L-2790, available from Gaker Caster Oil Co.; Vitikote L-304, available from Duro Commodities; Polyethylenes such as: Eastman Epolene N-11, Eastman Epolene C-12, available from Eastman Chemical Products Co.; Polyethylene DYJT, Polyethylene DYLT, Polyethylene DYNF, Polyethylene DYDT, all available from Union Carbide Corp.; Marlex TR 822, Marlex 1478, available from Phillips Petroleum Co.; Epolene C-13, Epolene C-10, available from Eastman Chemical Products, Co., Polyethylene AC8, Polyethylene AC612, Polyethylene AC324, available from Allied Chemicals; modified styrenes such as: Piccotex 75, Piccotex 100, Piccotex 120, available from Pennsylvania Industrial Chemical; Vinyl-acetate-ethylene copolymers such as: Elvax Resin 210, Elvax Resin 310, Elvax Resin 420, available from E. I. du Pont de Nemours & Co., Inc., Vistanex MH, Vistanex L–80, available from Enjay Chemical Co.; vinyl chloride-vinyl acetate copolymer such as: Vinylite VYLF, available from Union Carbide Corp.; styrene-vinyl toluene copolymers; polypropylenes; and mixtures thereof. The use of an insulating binder is preferred because it allows the use of a larger range of electrically photosensiitve pigments.

A mixture of microcrystalline wax and polyethylene is preferred because it is cohesively weak and an insulator.

Where the imaging layer is not sufficiently cohesively weak to allow imagewise fracture, it is desirable to include an activation step in the process of this invention. The activation step may take many forms such as heating the imaging layer thus softening it or applying a substance to the surface of the imaging layer or including a substance in the imaging layer which substance lowers the cohesive strength of the layer or aids in lowering the cohesive strength. The substance so employed is termed an "activator." Preferably, the activator should have a high resistivity so as to prevent electrical breakdown of the manifold sandwich. Accordingly, it will generally be found to be desirable to purify commercial grades of activators so as to remove impurities which might impart a higher level of conductivity. This may be accomplished by running the fluids through a clay column or by employing any other suitable purification technique. Generally speaking, the activator may consist of any suitable material having the aforementioned properties. For purposes of this specification and the appended claims, the term activator shall be understood to include not only materials which are conventionally termed solvents but also those which are partial solvents, swelling agents or softening agents for the imaging layer. The activator can be applied at any point in the process prior to separation of the manifold sandwich.

It is generally preferable that the activator have a relatively low boiling point so that fixing of the resulting image can be accomplished upon evaporation of the activator. If desired, fixing of the image can be accomplished more quickly with mild heating at most. It is to be understood, however, that the invention is not limited to the use of these relatively volatile activators. In fact, very high boiling point non-volatile activators including silicone oils such as dimethyl-polysiloxanes and very high boiling point long chain aliphatic hydrocarbon oils ordinarily used as transfer oils such as Wemco-C transformer oil, available from Westinghouse Electric Co., have also been successfully utilized in the imaging process. Although these less volatile activators do not dry off by evaporation, image fixing can be accomplished by contacting the final image with an absorbent sheet as paper which absorbs the activator fluid. In short, any suitable volatile or non-volatile activator may be employed. Typically activators include Sohio Odorless Solvent 3440, an aliphatic (kerosene) hydrocarbon fraction, available from Standard Oil Co. of Ohio, carbon tetrachloride, petroleum ether, Freon 214 (tetrafluorotetrachloropropane), other halogenated hydrocarbons such as chloroform, methylene chloride, trichloroethylene, perchloroethylene, chlorobenzene, trichloromonofluoromethane, tetrachlorodifluoroethane, trichlorotrifluoroethane, ethers such as diethyl ether, diisopropyl ether, dioxane, tetrahydrofuran, ethyleneglycol monoethyl ether, aromatic and aliphatic hydrocarbons such as benzene, toluene, xylene, hexane, cyclohexane, gasoline, mineral spirits and white mineral oil, vegetable oils such as coconut oil, babussu oil, palm oil, olive oil, castor oil, peanut oil and neatsfoot oil, decane, dodecane and mixtures thereof. Sohio Odorless Solvent 3440 is preferred because it is odorless, non-toxic and has a relatively high flash point.

Although the imaging layers may be prepared as self-supporting films, normally these layers are coated onto a sheet referred to as the donor sheet or substrate. For convenience the combination of imaging layer and donor sheet is referred to as the donor. The electrically photosensitive pigment may be added directly to a binder material and dispersed as, for example, by ball milling or by heating the binder to a temperature above its melting point and dispersing the pigments in the fluid binder material by simple mixing. After blending the ingredients of the imaging layer, the desired amount is coated on a substrate. In a particularly preferred form of the invention, an imaging layer is coated onto a transparent, electrically insulating donor sheet.

BRIEF DESCRIPTION OF THE DRAWINGS

The advantages of this improved method of imaging will become apparent upon consideration of the detailed disclosure of the invention especially when taken in conjunction with the accompanying drawings wherein:

Referring now to FIG. 1 of the drawings, there is seen a supporting donor substrate layer 11 and an imaging layer generally designated 12. In the manufacture of the imaging member, herein referred to as the manifold set, layer 12 is preferably coated on substrate 11 so that it adheres thereto. These layers are collectively referred to as the imaging donor or merely the donor. In this particular illustrative example, layer 12 consists of photoconductive pigment 13 dispersed in a binder 14. Above imaging layer 12 is an electrically conductive receiver sheet 16. This receiver sheet is ordinarily supplied as a separate layer which does not initially adhere to layer 12. Accordingly, although the whole imaging member or "manifold set" may be supplied in a convenient three-layer sandwich as shown in FIG. 1, receiver layer 16 may also be supplied as a separate sheet or roll if desired. On the other hand, in those systems where activation of the imaging layer is not required or where imaging layer 12 has been preactivated, sheet 16 may rest on imaging layer 12. In the particular embodiment of the manifold set shown in FIG. 1, both the donor substrate 11 and the receiver sheet 16 are made up of an electrically conductive material such as cellophane with at least one of them being optically transparent to provide for the exposure of layer 12. In this embodiment of the manifold set, sheets 11 and 16 act as the electrodes.

Figure 1:
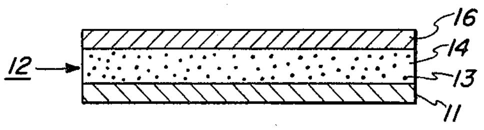
FIG. 1 is a side sectional view of a photosensitive imaging manifold set for use in the invention.

Combinations of the structure described in FIG. 1 may also be used in carrying out the invention with a relatively conductive layer immediately in contact with one side of imaging layer 12 and an electrically insulating sheet on the other side of the imaging layer.

Figures 2, 2A, 2B:
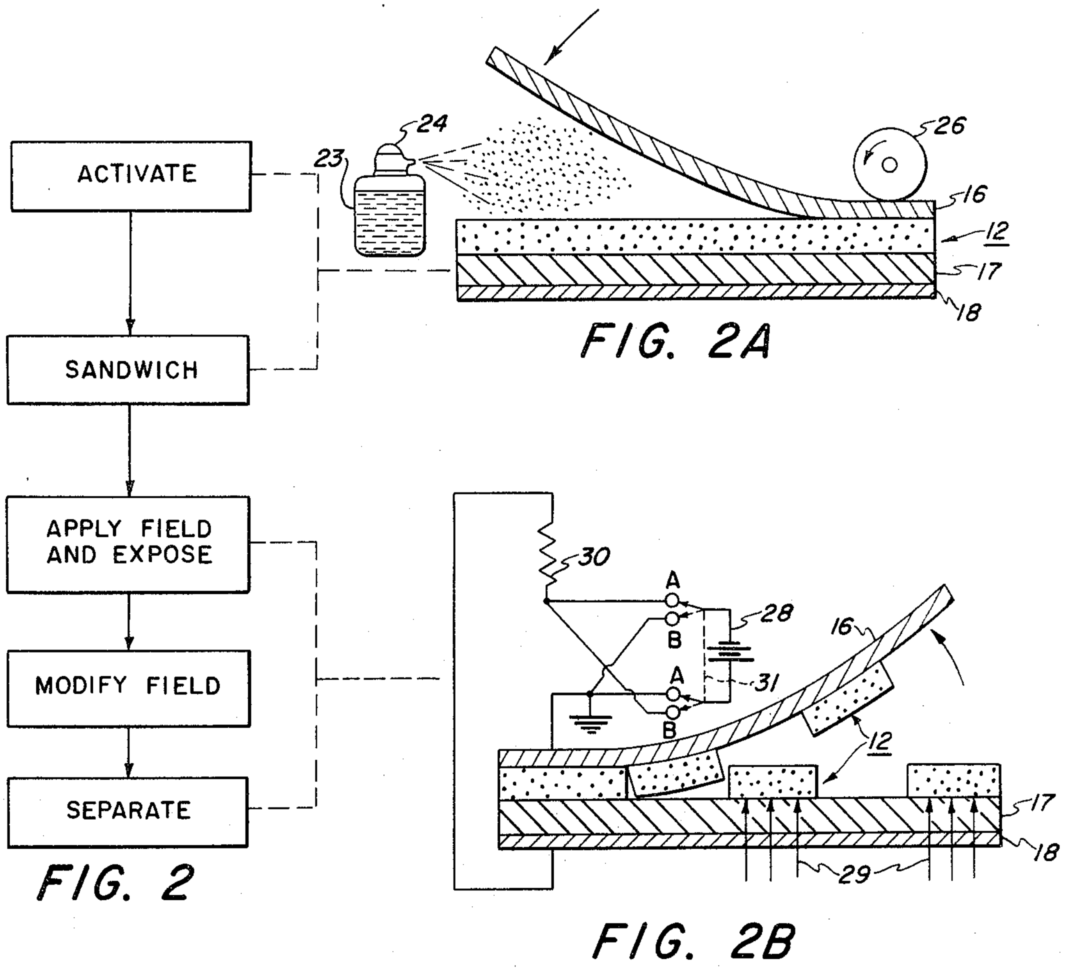
FIG. 2 is a process flow diagram of the method steps of the invention.
FIGS. 2*a* and 2*b* are side sectional view diagrammatically illustrating the process steps of the invention.

Referring now to the flow diagram of FIG. 2, it is seen that, when required, the activation step may be the first step in the imaging process. In this stage of the imaging process, the manifold set is opened and the activator is applied to imaging layer 12 following which these layers are closed back together again, as indicated in the second block of the process flow diagram of FIG. 2. Although the activator may be applied by any suitable technique, such as with a brush, with a smooth or rough surfaces roller, by flow coating, by vapor condensation or the like, FIG. 2*a* which diagrammatically illustrates the first two process steps shows the activator fluid 23 being sprayed on to imaging layer 12 of the manifold set from a container 24. The activator serves to swell or otherwise weaken and thereby lower the cohesive strength of imaging layer 12. The activator should preferably have a high level of resistivity to help prevent electrical breakdown of the manifold set.

It is generally preferable to include an activation step in the imaging process because if this step is included then a stronger and more permanent imaging layer 12 may be provided which can withstand storage and transportation prior to imaging.

Following the deposition of the activator fluid, the set is closed by a roller 26 which also serves to squeeze out any excess activator fluid which may have been deposited.

Although it is preferred to use a separate electrode, sheet 16 in FIG. 2*a* and FIG. 2*b* is shown as a conductive receiver sheet which also acts as an electrode.

Potential source 28 is connected to switch 31, to resistor 30, receiver sheet 16 and transparent conductive electrode 18. An electrical potential is applied across the manifold set and it is exposed to the image 29 to be reproduced. After imagewise exposure, the potential is modified by changing switch 31 from position A to position B. Modifications may also be achieved by lowering the voltage or grounding the circuit. Upon separation of substrate 17 and receiver sheet 16, imaging layer 12 fractures along the edges of exposed areas. Accordingly, once separation is complete, exposed portions of imaging layer 12 are retained on one of layer 17 and 16 while unexposed portions are retained on the other layer, resulting in the simultaneous formation of a high gamma positive image on one of the sheets and a high gamma negative on the other of opposite image sense than that obtained had switch 31 not been changed.

Although FIG. 2*b* shows a negative image being formed on the surface of substrate 17 and a positive image on sheet 16, the positions of these images may be reversed depending on the initial polarity of the applied field and the photoconductive materials used. Further, although layer 12 is shown as being exposed from the donor side, the layer may also be exposed from the receiver side.

If a relatively volatile activator is employed, such as petroleum ether or carbon tetrachloride, fixing occurs almost instantaneously after separation of layers 17 and 16 because the relatively small quantity of activator in the layer of imaging material flashed off very rapidly. With somewhat less volatile activators, such as the Sohio Odorless Solvent 3440 or Freon 214, described above, fixing may be accelerated by flowing air over the images or warming them to about 150° F., whereas with the even less volatile activators, such as transformer oil, fixing is accomplished by absorption of the activator into another layer such as a paper substrate to which the image is transferred. Many other fixing techniques and methods for protecting the images such as overcoating, laminating with a transparent thermoplastic sheet and the like will occur to those skilled in the art. Increased image durability and hardness may also be achieved by treatment with an image material hardening agent or with a hard polymer solution which will wet the image material.

In general, the apparatus for carrying out the imaging procedure described above will employ the elements illustrated in FIGS. 2*a* and 2*b* including a source of activator fluid, a squeegee roller to remove excess activator fluid, a power supply with series resistor, a switch and a set of electrodes which may or may not be built into the manifold set. Opening the manifold set for activation, closing the set for exposure and opening again for separation and image formation may be accomplished by any one of a number of techniques which will be obvious to those skilled in the art. However, one straightforward way to accomplish this result is to supply the imaging materials in the form of long webs which can be entrained over rollers so as to provide opening and closing of the set during the imaging process.

DESCRIPTION OF PREFERRED EMBODIMENTS

The following examples further specifically illustrate the present invention. The examples below are intended to illustrate various preferred embodiments of the improved imaging method. The parts and percentages are by weight unless otherwise indicated.

EXAMPLE I

A commercial metal-free phthalocyanine is first purified by o-dichlorobenzene extraction to remove organic impurities. Since this extraction step yields the less sensitive beta crystalline form, the desired X form is obtained by dissolving about 100 grams of beta in approximately 600 cc. of sulfuric acid precipitating it by pouring the solution into about 3000 cc. of ice water and washing with water to neutrality, the thus purified alpha phthalocyanine is then salt milled for 6 days and desalted by slurrying in distilled water, vacuum filtering, water washing and finally methanol washing until the initial filtrate is clear. After vacuum drying to remove residual methanol, the "X" form phthalocyanine thus produced is used to prepare the imaging layer according to the following procedure: About 5 grams of the "X" form phthalocyanine is added to about 5 grams of Algol Yellow GC, 1,2,5,6-di-(C,C'-diphenyl) thiazole-anthraquinone, C. I. No. 67300, available from General Dyestuffs, and about 2.8 grams of purified Watchung Red B, 1-(4'-methyl-5-chloroazobenzene - 2' - sulfonic acid)-2-hydroxy-3-naphthoic acid, C. I. No. 15865, available from E. I. du Pont de Nemours & Co. which is purified as follows: Approximately 240 grams of the Watchung Red B is slurried in about 2400 milliliters of Sohio Odorless Solvent 3440, a mixture of kerosene fractions available from the Standard Oil Company of Ohio. The slurry is then heated to a temperature of about 65° C. and held there for about ½ hour. The slurry is then filtered through a glass sintered filter. The solids are then reslurried with petroleum ether (90 to 120° C.) available from Matheson Coleman and Bell Division of the Matheson Company, East Rutherford, N.J., and filtered through a glass sintered filter. The solids are then dried in an oven at about 50° C.

About eight grams of Sunoco Microcrystalline Wax Grade 5825 having an ASTM–D–127 melting point of 151° F. available from Sunoco and about two grams Paraflint R.G., a low molecular weight paraffinic material available from the Moore & Munger Company, New York, N.Y., and about 320 milliliters of petroleum ether (90 to 120° C.) and about 40 milliliters of Sohio Odorless Solvent 3440 are placed with the pigments in a glass jar containing ½ inch flint pebbles. The mixture is then milled by revolving the glass jar at about 70 r.p.m. for about 16 hours. The mixture is then heated for approximately two hours at about 45° C. and allowed to cool to room temperature. The mixture is then ready for coating on the donor substrate. The paste-like mixture is then coated in subdued green light on 2 mil Mylar (a polyester formed by the condensation reaction between ethylene glycol and terephthalic acid available from E. I. du Pont de Nemours & Co., Inc.) with a No. 36 wire wound drawdown to produce a coating thickness when dried of approximately 7½ microns. The coating and two mil Mylar sheet is then dried in the dark at a temperature of about 33° C. for ½ hour. The coated donor is then placed on the tin oxide surface of a ⅛ inch NESA glass plate with its coating facing away from the tin oxide. A receiver sheet of aluminum coated paper is placed over the donor. A sheet of black electrically conductive paper available as Grade 505 black photographic paper from Knowlton Paper Company, Watertown, N.Y., is placed over the receiver sheet. The receiver sheet is then lifted up and the imaging layer activated with one brush stroke of a wide camel's hair brush saturated with Sohio 3440. The receiver sheet is then lowered back down and a roller is rolled slowly once over the closed manifold set with light pressure to remove excess solvent. The positive terminal of a 9000 volt DC power supply is then connected to the NESA coating in series with a 5500 megohm resistor and the negative terminal is connected to the black opaque electrode which is in contact with the aluminum coating and grounded. With the voltage applied, a white incandescent light is projected through the NESA glass using a 300 watt Bell and Howell Headliner Model 708 Duo Slide Projector having a piece of Trans-Positive sheet (frosted) available from Xerox, Rochester, N.Y., and a variable aperture placed in front of it. The distance from the projector to the imaging donor layer is approximately 60 inches. The light incident on the imaging layer is approximately 1 foot-candle. The imagewise exposure is continued for about 1.0 second resulting in an application of total incident energy on the imaging layer of about 1.0 foot-candle second. After exposure the positive terminal of the above mentioned 9,000 volt power supply is then connected to the NESA coating and the negative terminal is connected to the black opaque electrode again in contact with the aluminum coating and grounded. Potential is applied for about 10 seconds. After reverse biasing, the receiver sheet is peeled from the set with the potential source still connected. The small amount of Sohio present evaporates after separation of the sheets yielding a pair of excellent quality images with a positive image adhering to the receiver sheet and a negative image on the donor sheet.

EXAMPLE II.—PRIOR ART

The experiment of Example I is repeated except that immediately after imagewise exposure and prior to reversing the field across the imaging layer the receiver sheet is peeled from the set with the potential source still connected. Upon separation of the sheets, a pair of high quality images are observed with the positive image adhering to the donor sheet and a negative image adhering to the receiver sheet.

EXAMPLE III

About 2½ grams of the "X" form of phthalocyanine prepared as in Example I, about 1.2 grams of Algol Yellow and about 2.8 grams of Irgazine Red available from the Geigy Chemical Company are added to about 60 milliliters of Petroleum Ether heated to about 90–120° C., and milled as in Example I for about 16 hours. The mixture is then added to a binder prepared as follows:

About 1 mol of alpha methyl styrene and about 1 mol of vinyl toluene are added to sufficient xylene to produce a 40% solution. A catalytic amount of boron trifluoride etherate is then added and the mixture stirred until polymerization is complete. After polymerization, sufficient methanol is added to decompose any boron trifluoride present, the polymer is then isolated by steam distillation. The resulting polymer is available as Piccotex 100 from the Pennsylvania Industrial Chemical Company.

About 2½ grams of the Piccotex 100 is added to about 3 grams of Polyethylene DYLT available from the Union Carbide Company, and about 1½ grams of Paraflint R.G. and about ½ gram of Elvax 420, an ethylene-vinyl-acetate copolymer available from the E. I. du Pont de Nemours & Company. The mixture is then dissolved in about 20 milliliters of Sohio 3440 at about the boiling point. The solution is then allowed to cool to room temperature. The solution is then added to the mixture of pigments and milled as in Example I for about 16 hours. The mixture is heated to a temperature of approximately 65° C. for approximately 2 hours. It is then allowed to cool to approximately room temperature. About 60 milliliters of reagent grade isopropanol is then added to the mixture and milled for about another 15 minutes. The paste is then ready for coating on a donor substrate. The paste is then coated in subdued green light on 2 mil Mylar with a No. 36 wire wound drawdown rod to produce a coating thickness dry of about 7½ microns. The donor is then dried in the dark at a temperature of about 33° C. for about 30 minutes. The coated donor is then placed on the tin oxide surface of a NESA glass plate with its coating facing away from the tin oxide. A receiver sheet of 1 mil thick Tedlar, available from E. I. du Pont de Nemours & Co., Inc. under the trade name "Tedlar" is placed over the donor layer. Then a sheet of the black electrically conductive paper is placed over the receiver sheet to form the complete manifold set. The receiver sheet is then lifted up and the imaging layer activated with one quick brush stroke of a wide camel's hair brush saturated with Sohio Solvent 3440. The receiver sheet is then lowered back down and a roller is rolled slowly once over the closed manifold set with light pressure to remove excess activator. The positive terminal of 9,000 volt DC power supply is then connected to the NESA coating in series with a 5,500 megohm resistor and the negative terminal is connected to the black opaque electrode and grounded. With the voltage applied, an image is projected onto the imaging layer as in Example I. The imagewise exposure is continued for about 0.7 second resulting in the application of a total incident energy of about 0.7 foot-candle second on the imaging layer. After exposure the power supply is disconnected and the manifold set is subjected to a reversing field applied by connecting the positive terminal of a 5,000 volt DC power supply to the NESA glass and connecting the negative terminal to the black opaque electrode and ground. The reversing potential is applied for approximately 2 seconds. The receiver sheet is then peeled from the set with the potential still applied yielding a pair of high quality images with the positive image adhering to the receiver sheet and a negative image adhering to the donor sheet.

EXAMPLE IV

The experiment of Example III is repeated with the exception that there is no imagewise exposure. The receiver sheet is stripped from the manifold set. Substantially all of the imaging layer is found adhering to the receiver sheet.

EXAMPLE V

The experiment of Example III is repeated except that the NESA glass electrode is replaced by an image shaped conductive electrode and no imagewise electromagnetic radiation exposure is used. The receiver sheet is peeled from the set yielding a high quality pair of images with the positive image or duplicate of the original adhering to the receiver sheet and a negative image adhering to the donor sheet.

EXAMPLE VI

About 6.4 grams of the "X" form phthalocyanine prepared as in Example I, about 6.4 grams of Algol Yellow, about 8 grams of Sunoco Wax 5825, about 2 grams of Paraflint R.G., about 60 ml. ethanol and about 360 ml. of petroleum ether (90–120° C.) are milled as in Example I for 16 hours. The paste-like mixture is then coated on a 2 mil Mylar sheet as in Example I and dried in the dark at a temperature of about 33° C. for ½ hour. The donor is placed on the tin oxide surface of a NESA glass, coated side up. The imaging layer is then activated with one brush stroke of a wide camel's hair brush saturated with Sohio Solvent 3440. A receiver sheet of 2 mil cellophane is then placed over the activated imaging layer forming the completed manifold set. The manifold set is then charged as in Example III except that the receiver side electrode is connected to the negative terminal of a potential source of 8,000 volts DC. The imaging layer is then exposed to an image as in Example III except that the exposure is continued for about 0.85 second resulting in a total exposure of 0.85 foot-candle second. The receiver side electrode is then connected to the positive terminal of a 1,000 volt DC power supply and the donor side electrode connected to the negative terminal. The receiver sheet is then peeled from the set yielding a pair of images with a positive image adhering to the receiver sheet and a negative image adhering to the donor sheet.

EXAMPLE VII

The experiment of Example VI is repeated except that after imagewise exposure the receiver side electrode is connected to the negative terminal of a 4,000 volt DC power supply and the donor side electrode connected to the positive terminal and grounded. The receiver sheet is then peeled from the set yielding a pair of excellent quality images with a positive image adhering to the receiver sheet and a negative image adhering to the donor sheet.

EXAMPLE VIII

The procedure of Example III is repeated except that the receiver side electrode is replaced by an image shaped conductive electrode and no imagewise electromagnetic radiation exposure is used. The receiver sheet is peeled from the manifold sandwich yielding a high quality pair of images with the positive image adhering to the receiver sheet and a negative image adhering to the donor sheet.

Although specific components and proportions have been stated in the above description of preferred embodiments of the invention, other typical materials as listed above, if suitable, may be used with similar results. In addition, other materials may be added to the mixture to synergize, enhance or otherwise modify the properties of the imaging layer. For example, various dyes, spectral sensitizers or electrical sensitizers such as Lewis acids may be added to the several layers.

Other modifications and ramifications of the present invention will occur to those skilled in the art upon a reading of the present disclosure. These are intended to be included within the scope of this invention.

What is claimed is:

1. A method of imaging comprising:

(a) providing a manifold set comprising an electrically photosensitive imaging layer sandwiched between a donor sheet and an electrically conductive receiving sheet, said layer being structurally fracturable in response to the combined effect of an applied electrical field and exposure to electromagnetic radiation to which said layer is sensitive, at least one of said donor and receiver sheet being at least partially transparent to said electromagnetic radiation;

(b) maintaining an electric field across said imaging layer by means of a potential across said set;

(c) exposing said imaging layer to a pattern of activating electromagnetic radiation;

(d) modifying said electric field across said imaging layer wherein said modification involves reducing, grounding or reversing the potential across said manifold set; and (e) separating said receiver sheet from said donor sheet whereby said imaging layer fractures in imagewise configuration forming a positive image conforming to the original on one of said receiver and donor sheets and a negative image on the other of said receiver and donor sheets and whereby the location of said images with respect to said donor and receiver sheets are reversed from those obtained in the above process in the absence of step (d).

2. The method of claim 1 wherein said modification comprises reducing said potential.

3. The method of claim 1 wherein said modification comprises grounding the potential across said manifold set.

4. The method of claim 1 wherein said modification comprises reversing the polarity of said potential across said manifold set.

5. The method of claim 1 wherein said donor sheet is at least partially transparent and said imaging layer is exposed through said donor sheet.

6. The method of claim 1 wherein said receiver sheet is at least partially transparent and said imaging layer is exposed through said receiver sheet.

7. The method of claim 1 further including the step of rendering said imaging layer structurally fracturable by means of applying an activator to said imaging layer prior to its exposure said activator selected from the group consisting of partial solvents, solvents and swelling agents for said imaging layer and heat.

8. The method of claim 1 wherein said imaging layer comprises metal-free pthalocyanine in a binder.

9. The method of claim 1 wherein said imaging layer comprises metal-free phthalocyanine in an X crystalline form in a binder.

10. The method of claim 1 wherein said imaging layer comprises a mixture of photosensitive pigments in a binder.

11. The method of claim 1 wherein said imaging layer comprises a photosensitive composition in a binder said binder comprising an insulating resin composition.

12. The method of claim 1 wherein said imaging layer comprises a photosensitive composition in a binder said binder comprising a thermoplastic insulating composition.

13. A method of imaging comprising:

(a) providing a manifold set comprising an imaging layer sandwiched between a donor sheet and an electrically conductive receiver sheet, said layer being structurally fracturable in response to the effect of an applied electric field;

(b) maintaining an electric field across said imaging layer by means of a potential across said set;

(c) modifying said electric potential in image configuration wherein said modification involves reducing, grounding or reversing said potential across said set; and (d) separating said receiver sheet from said donor sheet whereby said imaging layer fractures in imagewise configuration forming a positive image on one of said donor and receiver sheets and a negative image on the other of said donor and receiving sheets and whereby the location of said images with respect to said donor and receiver sheets are reversed from those obtained in the above process in the absence of step (c).

14. A method of manifold layer transfer comprising:

(a) providing a manifold set comprising an imaging layer sandwiched between a donor sheet and an electrically conductive receiving sheet, said layer being structurally fracturable in response to the effect of an applied electric field, said imaging layer having a stronger initial degree of adhesion for said donor sheet than for said receiving sheet;

(b) maintaining an electric field across said imaging layer by means of a potential across said set;

(c) modifying said electric potential across said set wherein said modification involves reducing, grounding or reversing said potential across said manifold set; and (d) separating said receiving sheet from said donor sheet whereby said imaging layer transfers to said receiver sheet as a result of said field modification.

15. The method of claim 14 wherein said imaging layer comprises dispersed organic photosensitive particles in a binder.

16. The method of claim 14 wherein said imaging layer comprises a photosensitive composition dispersed in a binder.

17. The method of claim 14 further including the step of rendering said imaging layer structurally fracturable by means of applying an activator to said layer said activator selected from the group consisting of partial solvents, solvents and swelling agents for said imaging layer and heat.

18. The method of claim 14 wherein said imaging layer comprises metal-free phthalocyanine in a binder.

19. The method of claim 14 wherein said imaging layer comprises the X crystalline form of metal-free phthalocyanine in a binder.

20. The method of claim 13 further including the steps of rendering said layer structurally fracturable by means of applying an activator to said imaging layer prior to modifying said electric field in image configuration said activator selected from the group consisting of solvents, partial solvents and swelling agents for said imaging layer and heat.

21. The method of claim 13 wherein said imaging layer comprises an organic photosensitive composition dispersed in a binder.

22. The method of claim 20 wherein said imaging layer comprises a non-photosensitive pigment dispersed in a binder.

23. The method of claim 13 wherein said electric field is in image configuration.

References Cited

UNITED STATES PATENTS

| | | | |
|---|---|---|---|
| 3,573,904 | 4/1971 | Clark | 96—1 |
| 3,565,612 | 2/1971 | Clark | 96—1 |

CHARLES E. VAN HORN, Primary Examiner

R. E. MARTIN, Assistant Examiner

U.S. Cl. X.R.

96—1 R, 1.5; 117—93, 37 R

Disclaimer and Dedication 3,676,116.—*Ivar T. Krohn*, *Geoffrey A. Page* and *Gedeminas J. Reinis*, Rochester, N.Y. IMAGE REVERSAL IN MANIFOLD IMAGING USING AN ELECTRICALLY CONDUCTIVE RECEIVER SHEET. Patent dated July 11, 1972. Disclaimer and dedication filed Apr. 26, 1972, by the assignee, *Xerox Corporation.*

Hereby disclaims and dedicates to the Public the portion of the term of the patent subsequent to Apr. 11, 1989.

[*Official Gazette September 4, 1973.*]